UNITED STATES PATENT OFFICE.

CHARLES HERENDEEN, OF CHICAGO, ILLINOIS.

ART OF MAKING FLOUR.

958,495.  Specification of Letters Patent.  Patented May 17, 1910.

No Drawing.   Application filed August 6, 1909. Serial No. 511,563.

*To all whom it may concern:*

Be it known that I, CHARLES HERENDEEN, a citizen of the United States, residing at Chicago, in the county of Cook and State of Illinois, have invented certain new and useful Improvements in Art of Making Flour, of which the following is a specification.

My invention relates to an improved method of making flour, and it has for its object the production of a flour which will produce a product capable of absorbing and retaining more moisture than does the flour prepared in the usual way, whereby the bread made from flour to which flour made in accordance with my method has been added will be rendered more palatable and nourishing as a food, and will retain its freshness for a longer period.

Flour prepared in the usual manner is capable of absorbing moisture only to an extent of about seventy-five per cent. of its own weight. Flour prepared according to my method will absorb moisture from five to six times its own weight, and by using a mixture of flour prepared according to my method and flour prepared in the ordinary manner in the proportions of about twenty per cent. of the former to eighty per cent. of the latter I produce a product capable of absorbing the required degree of moisture and a product from which bread can be made having the superior characteristics hereinbefore enumerated. In addition to the superior quality of the bread made from my product when combined as stated with flour prepared according to the ordinary method, a larger amount of bread can be made from a given quantity of flour.

In carrying out my method I take any flour, either coarse or fine, preferably however a flour prepared from white corn as containing a high percentage of starch, and add a sufficient amount of water thereto to form a paste. This paste is now passed between hot rolls which roll it out into a very thin sheet and the action of the heat thereon causes the moisture which has been absorbed by the starch cells to burst the same. The heat from the rolls in addition to causing the disruption of the starch cells causes the evaporation of the moisture from the paste and it passes from the rolls in dry flakes or sheets. The flakes or sheets produced by the above steps are then ground into flour, being preferably passed through what is ordinarily termed the full roller process. The resultant product differs in no manner, in consistency or appearance, from the flour prepared in the ordinary way, the sole difference being in the structure of the starch cells which have been disrupted by my process and which therefore are opened out and capable of absorbing a very much greater amount of moisture than when in their normal condition. The flour thus produced is, as before stated, adapted for use, when added to flour prepared in the ordinary manner and in the proportions of each preferably about as hereinbefore described.

What I claim is—

The process of making baker's flour having an unusual capacity for absorbing moisture, which consists in moistening flour having a high starch content to form a paste, spreading this paste into a thin film and disrupting the starch cells therein and drying such paste by passing it through rollers heated to the required temperature, grinding the product, and mixing therewith a larger quantity of ordinary baker's flour in which the starch cells are not ruptured.

In testimony whereof I affix my signature in presence of two witnesses.

CHARLES HERENDEEN.

Witnesses:
 LILLIAN PANKHURST,
 MABEL PAULSEN.